Aug. 27, 1957   R. A. BLOMGREN ET AL   2,804,165
ARRANGEMENT FOR REPLACING FILTERS
Filed Sept. 28, 1956   5 Sheets-Sheet 1
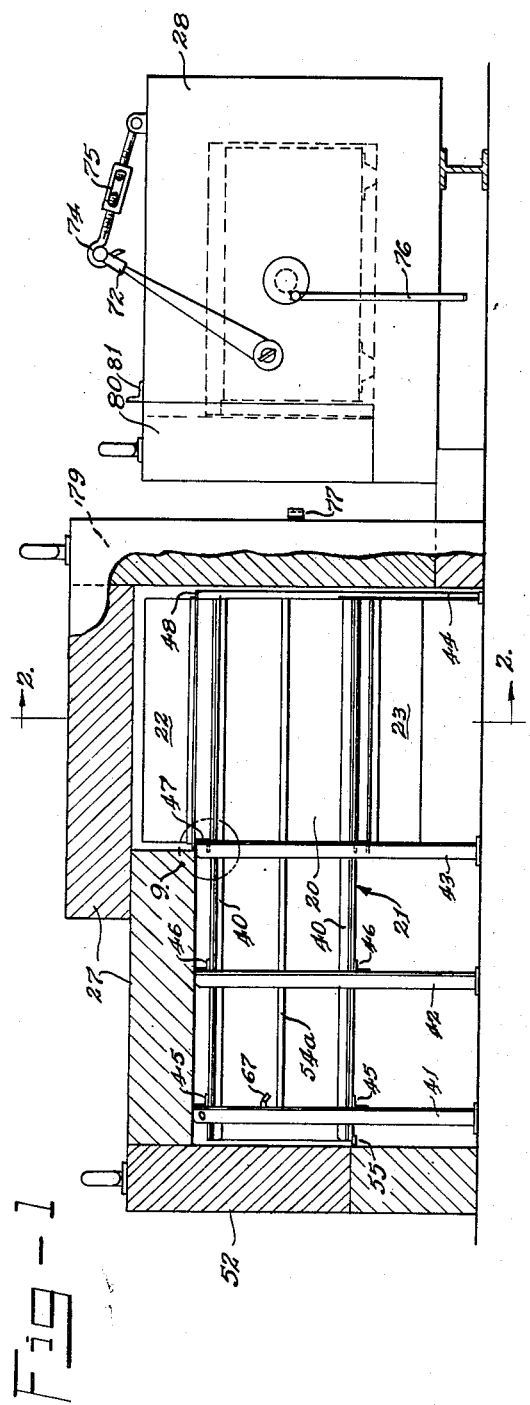
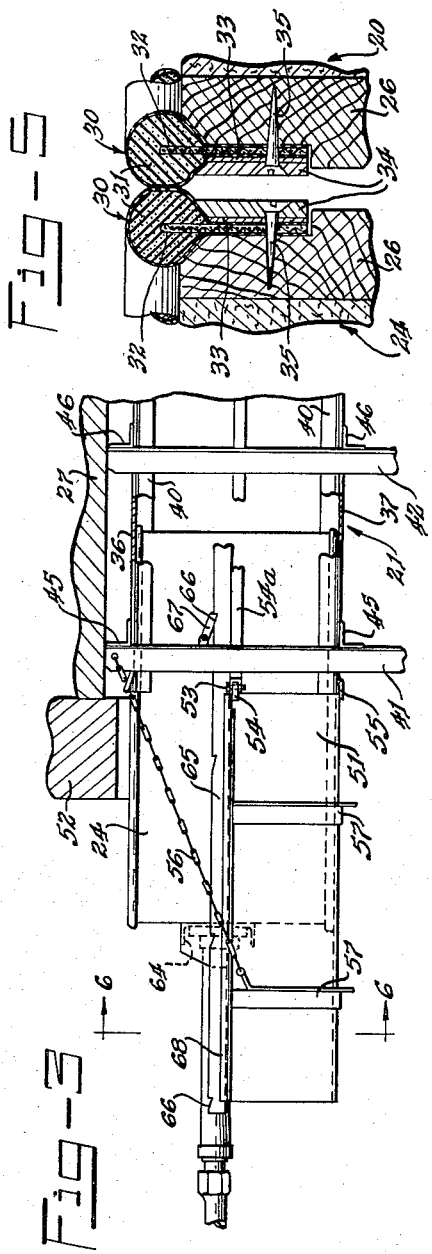
INVENTORS
Roland A. Blomgren
Nils J. G. Bohlin
BY
Roland A. Anderson
Attorney Aug. 27, 1957 R. A. BLOMGREN ET AL 2,804,165
ARRANGEMENT FOR REPLACING FILTERS
Filed Sept. 28, 1956 5 Sheets-Sheet 2
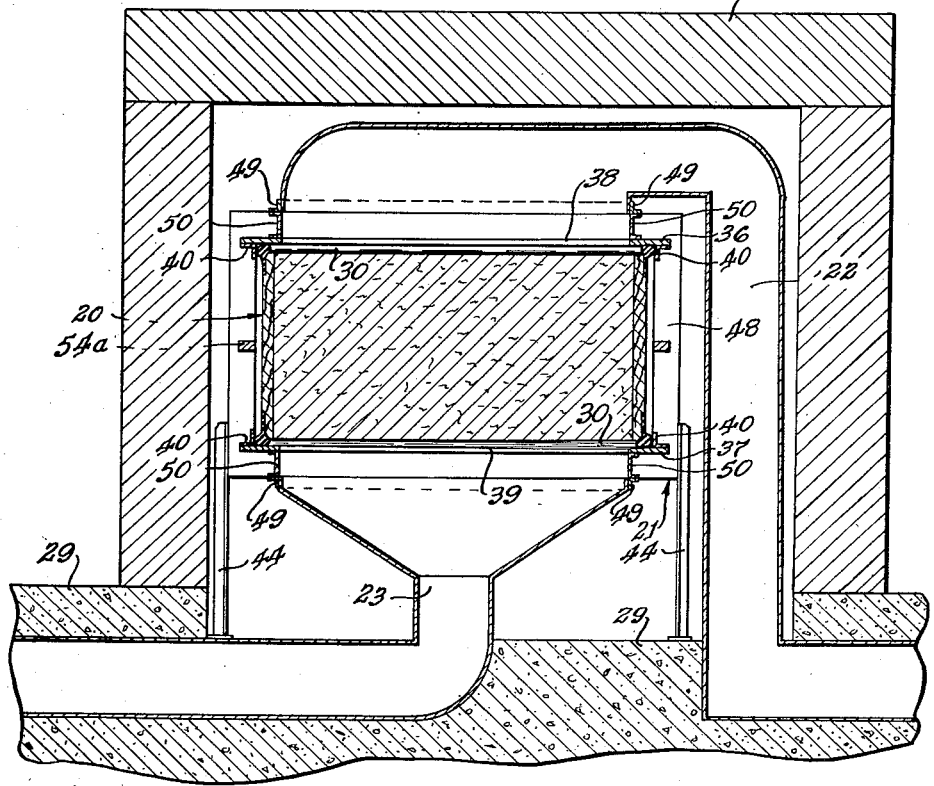
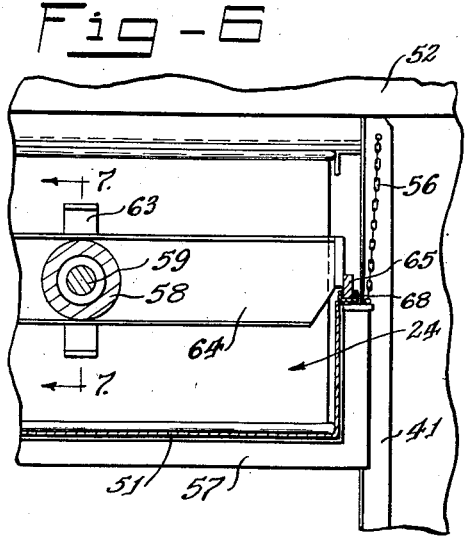
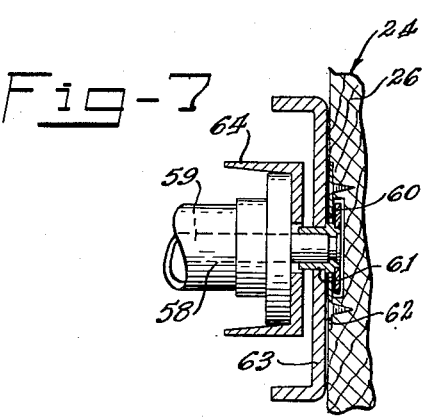
INVENTORS
Roland A. Blomgren
Nils J. G. Bohlin
BY
Roland A. Anderson
Attorney

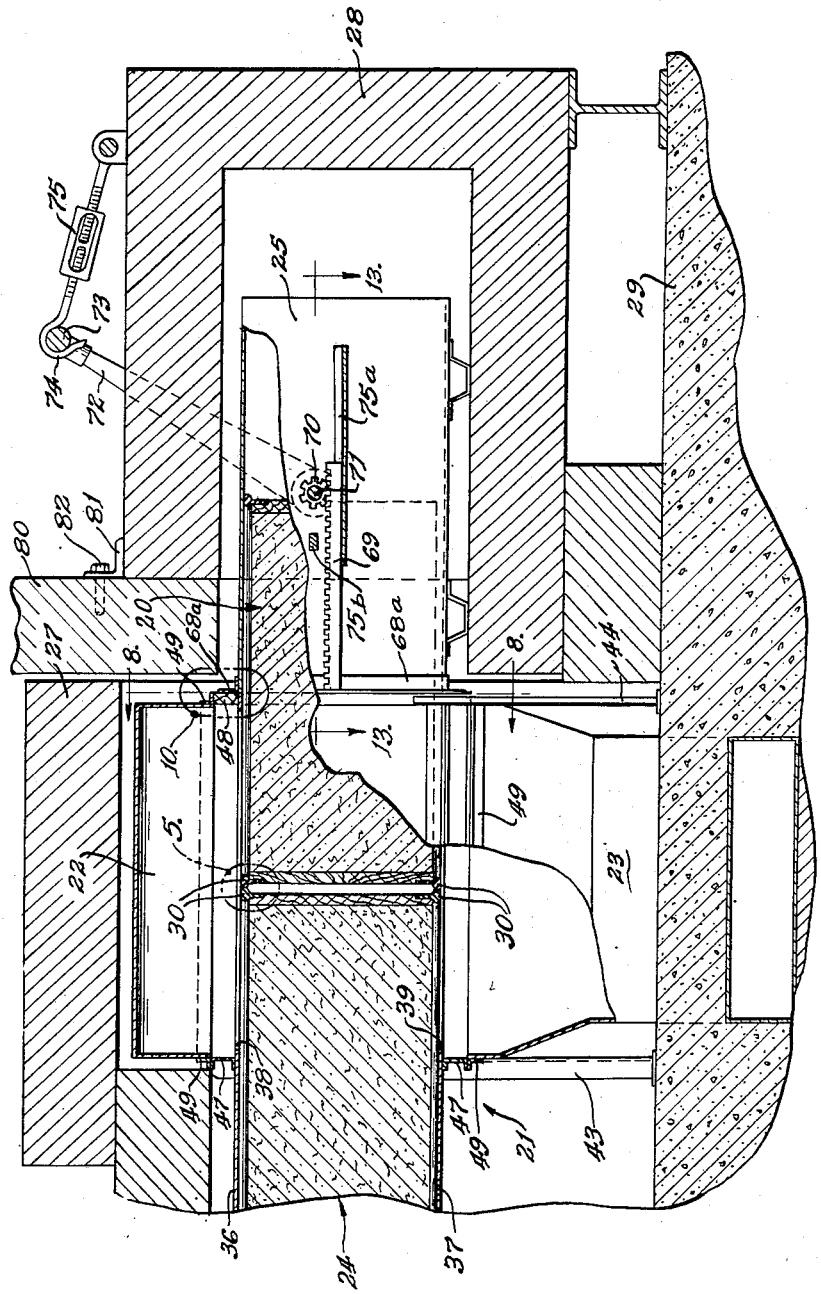

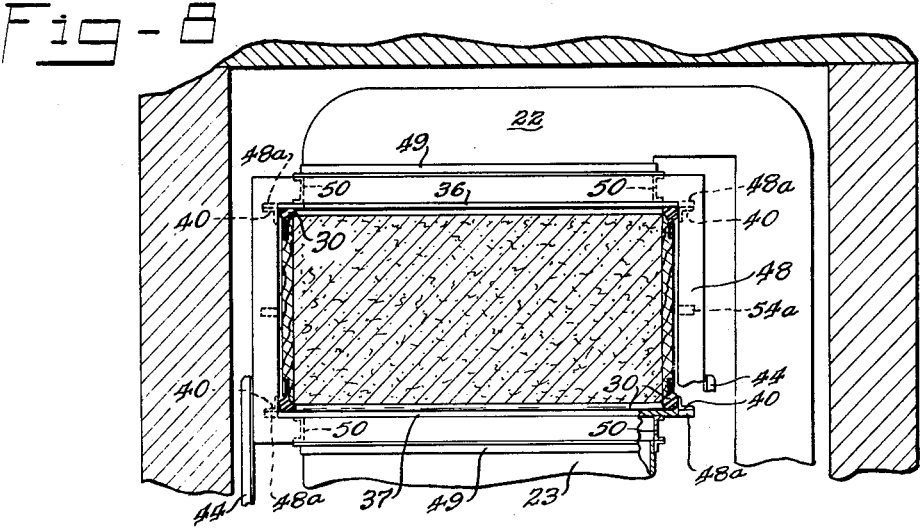
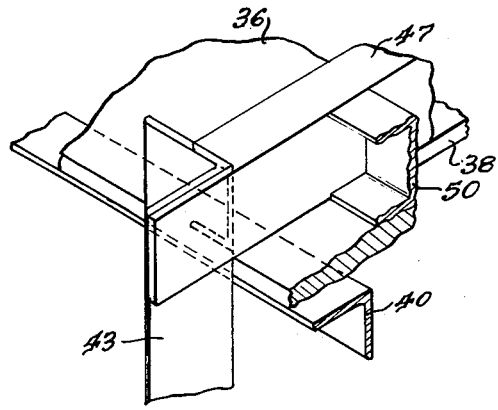
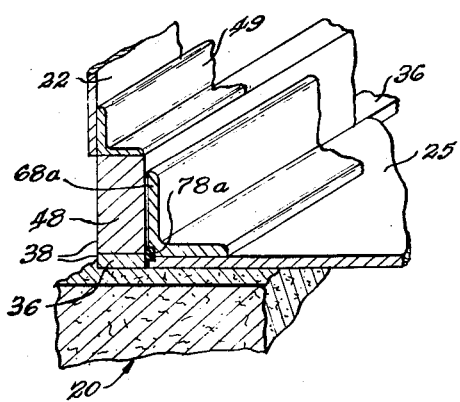

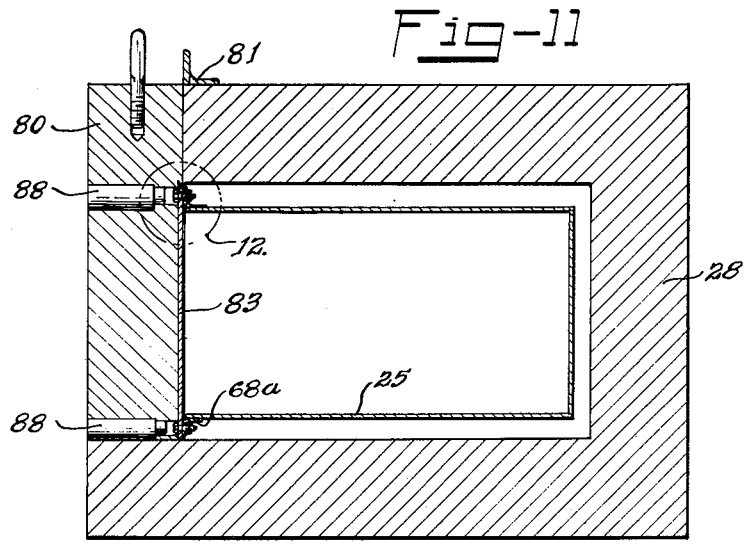
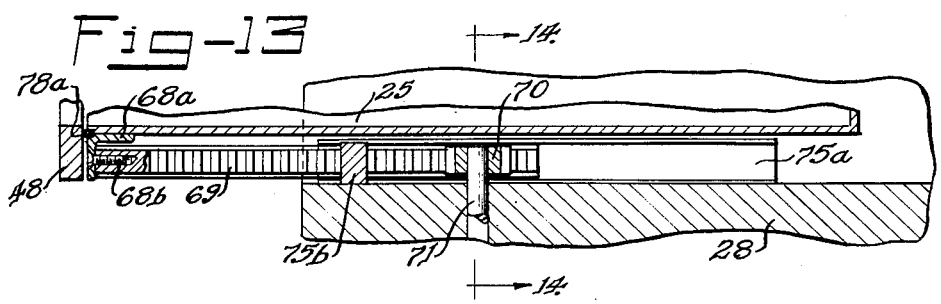
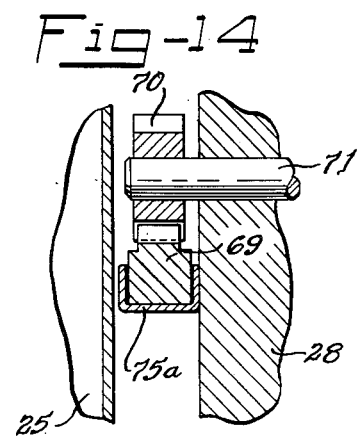
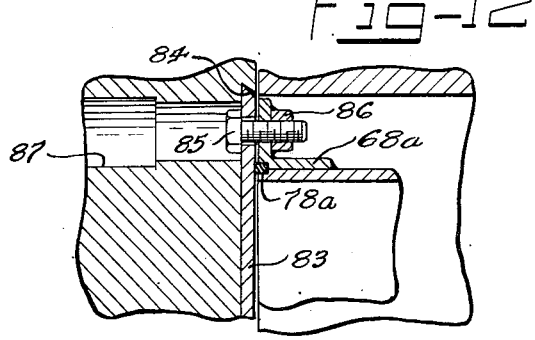

United States Patent Office 2,804,165
Patented Aug. 27, 1957

2,804,165

ARRANGEMENT FOR REPLACING FILTERS

Roland A. Blomgren and Nils J. G. Bohlin, Chicago, Ill., assignors to the United States of America as represented by the United States Atomic Energy Commission Application September 28, 1956, Serial No. 612,904

4 Claims. (Cl. 183—46)

This invention relates to an arrangement for replacing filters.

When a filter located in a conduit for removing radioactive or poisonous substances from a fluid flowing through the conduit is to be replaced, it is important that the replacing of the filter not block the conduit or permit the fluid to go unfiltered past the region where the filter is located.

According to the present invention, seals attached to an old filter and a replacement filter and a housing in which the filters are positioned are so constructed and arranged that, as the replacement filter pushes out the old filter, the filters and housing are sealed to one another and so permit only a filtered flow of fluid through the filters.

In the drawings:

Fig. 1 is an elevational view partly in section, of an apparatus mounting a filter and providing for its removal;

Fig. 2 is a sectional view taken on the line 2—2 of Fig. 1 and showing the location of the filter in a housing between conduits;

Fig. 3 is a sectional view of a portion of the apparatus of Fig. 1 showing the attachment thereto of a device for inserting a new filter;

Fig. 4 is a sectional view of the apparatus of Fig. 1 showing how a new filter is inserted and pushes out an old one;

Fig. 5 is an enlarged sectional view of the portions contained in circle 5 of Fig. 4, more particularly, the seals on the new and old filters in engagement with one another;

Fig. 6 is a sectional view taken on the line 6—6 of Fig. 3 and showing a tray used for inserting a new filter;

Fig. 7 is a sectional view taken on the line 7—7 of Fig. 6 and showing the connection of a new filter with a piston rod for inserting the same;

Fig. 8 is a sectional view taken on the line 8—8 of Fig. 4 and showing a used filter emerging from a housing between conduits;

Fig. 9 is a fragmentary perspective view, partly in section, of the parts of the housing contained in circle 9 of Fig. 1;

Fig. 10 is a fragmentary perspective view, partly in section, of portions contained in a circle 10 of Fig. 4, more particularly, parts of the housing and a receiving container for the used filter, which parts abut during removal of the used filter;

Fig. 11 is a vertical sectional view showing the container and a shielding pot enclosing the same;

Fig. 12 is a fragmentary sectional view of the portions of the container and pot located in the circle 12 of Fig. 11;

Fig. 13 is an horizontal sectional view taken on the line 13—13 of Fig. 4 and showing a gear and rack connected to the container and shielding pot for manipulating the container with respect to the pot; and Fig. 14 is a sectional view taken on the line 14—14 of Fig. 13 and illustrating the mounting of the gear and rack in the shielding pot.

As shown in Figs. 1 and 2, a filter 20 is held in a housing 21 so as to filter a gas coming from an inlet conduit 22 and going out through an outlet conduit 23. As shown in Fig. 4, when the filter 20 is to be replaced, a new filter 24 is inserted in the housing 21 and pushes out the old filter 20 into a container 25, which has been moved up into abutting engagement with one end of the housing 21.

It is contemplated that the filter 20 or 24 may comprise a fiber-glass or paper matting (not shown) folded to extend back and forth across a square wooden frame 26 with its ends and side edges attached thereto, and may further comprise spacer strips (not shown) of aluminum or stiff paper inserted in the folds of matting to support and hold apart the various sections thereof. The ends of the spacer strips will be anchored on the frame 26.

It is intended that the filter 20 or 24 remove from the gas going through the conduits 22 and 23, noxious particles and radioactive particles. Because of the radioactive particles a steel shielding structure 27 and a steel shielding pot 28 are provided for enclosing the housing 21 and the container 25, respectively. For the same reason the inlet conduit 22 and the outlet conduit 23 are set in a concrete floor 29.

As shown in Figs. 2, 4, 5, and 8, each of the filters 20 and 24 is provided at each open end with a seal 30, which runs around the associated open end and extends beyond the sides and open end of the filter, so that when the filter 24 is pushing the filter 20 out of the housing 21, the seals 30 of the filter 20 are in sealing engagement with the seals 30 of the filter 24.

As shown in Fig. 5, each seal 30 is set in a recess in an outside corner of the associated frame 26 and comprises a round core 31 of neoprene-covered sponge rubber formed in a square loop round at the corners to conform to the square outline of the frame 26, a neoprene-covered mounting leg 32 formed of wire-and-cord mesh and shaped in a square loop round at the corners, a steel band 33 shaped in a square loop round at the corners, and four aluminum strips 34. The mounting leg 32 is both inside and outside the core 31 and serves to support the same. The band 33 holds the mounting leg 32 against the frame 26. The strips 34 prevent the core 31 from being rolled over. Screws 35 secure the strips 34, band 33, and mounting leg 32 to the frame 26.

As shown in Figs. 2 and 8, the housing 21 essentially comprises parallel upper and lower plates 36 and 37 which tightly engage the seals 30 of the filter 20, have openings 38 and 39, respectively, where the conduits 22 and 23 are connected to the housing 21, and carry tracks 40 which tightly engage the seals 30 so that the filters 20 and 24 may register with the openings 38 and 39 and the conduits 22 and 23. When the filter 20, for example, registers with the openings 38 and 39, the seals 30 engage portions of the plates 36 and 37 radially outward of the openings 38 and 39 so that gas passing from the conduit 22 to the conduit 23 can go only through the filter 20. As shown in Fig. 4, the openings 38 and 39 are located adjacent the end of the housing 21 through which the used filter 20 is discharged. The plates 36 and 37 are imperforate throughout regions extending for a substantial distance from the openings 38 and 39, i. e., leftward from these openings as viewed in Figs. 1 and 4, so that when as shown in Fig. 4, the new filter 24 is being inserted and is pushing the used filter 20 out, there is no leakage through the new filter 24, but access thereto is had only through the openings 38 and 39 in the plates 36 and 37.

The plates 36 and 37 are held in spaced relation to one another by four pairs of legs 41, 42, 43, and 44, cross pieces 45, 46, and 47, and a rectangular frame 48. The legs 41—44 and cross pieces 45 and 46 are in the form of angle members. As shown in Figs. 1 and 3, the cross pieces 45 are secured to the top and bottom of the plates 36 and 37, respectively, and to the pair of legs 41, and the cross pieces 46 are secured to the top and bottom of the plates 36 and 37, respectively, and to the pair of legs 42. As shown in Figs. 4 and 9, the cross pieces 47 are of U-shape and are secured to the top and bottom of the plates 36 and 37, respectively, and to the pair of legs 43. As shown in Figs. 4, 8, and 10, the rectangular frame 48 is secured to the pair of legs 44 and also to the plates 36 and 37. The plates 36 and 37 have end portions of reduced width which extend into the frame 48. The fact that the plates 36 and 37 are reduced in width at these portions in order to extend into the frame 48 is demonstrated by the fact that the side edges 48a of the plates appear dotted behind the frame 48 in Fig. 8.

The inlet and outlet conduits 22 and 23 are secured to the housing 21 through securement of flanges 49 on the conduits to the cross pieces 47 and the rectangular frame 48, as shown in Figs. 4 and 10. These flanges are also secured to U-shaped members 50, which are secured to the top and bottom of the plates 36 and 37, respectively, and extend between the cross pieces 47 and the frame 48, as shown in Figs. 2, 8, and 9.

The new filter 24 is inserted in the housing 21 with the help of a U-shaped tray 51 which is connected to the housing after removal of a door 52 of the shielding structure 27, as shown in Fig. 3. The tray 51 is connected to the housing 21 by a pair of pins 53, one of which is shown in Fig. 3 to pass through a leg 54 on one end of the tray 51 and one end of a bar 54a secured to the legs 41, 42, 43, and 44 and extending parallel to the plates 36 and 37. A lip 55 attached to one end of the tray 51 slips under one end of the lower plate 37. The tray 51 is also connected to the housing 21 by a pair of chains 56 one of which is shown in Fig. 3 to be connected to one of the cross pieces 45 and to one of two reinforcing angle members 57 extending about the tray 51.

The new filter 24 is first placed in the tray 51 and is then pushed between the upper and lower plates 36 and 37 by hydraulic means comprising a cylinder 58 and a piston (not shown) reciprocable in the cylinder and attached to a piston rod 59 projecting through one end of the cylinder, as shown in Figs. 6 and 7. The piston rod 59 is detachably connected to the frame 26 of the new filter 24 by means of an oblong piece 60 which is rotatably connected to the end of the rod 59 by a mounting member 61 and is received in a recess formed in the frame 26 after being inserted through an oblong aperture in a plate 62 fastened to the frame 26 and then rotated about 90° by means of a handle 63 attached to the mounting member 61.

To the end of the cylinder 58 is attached a transverse channel 64 to the ends of which are connected two strips 65 having well spaced ratchet notches 66 engageable with two pawls 67 pivotally carried by the legs 41, as shown in Figs. 3 and 6 for one strip 65 and one pawl 67. As shown in Figs. 3 and 6 for one strip 65, the two strips 65 ride in U-shaped tracks 68 attached to the tray 51 and on the bars 54a which are aligned with the tracks 68 when the tray 51 is connected to the housing 21.

The new filter 24 is inserted in the housing 21 progressively by strokes of the piston in the cylinder 58 equal to the spacing between the notches 66 in the strips 65. At the start the pawls 67 engage the notches at or near the ends of the strips 65 at the right as viewed in Fig. 3, and pressure fluid is admitted to the cylinder 58 against the piston so as to shift the filter 24 away from the end of the cylinder 58 to the right as viewed in Fig. 7, thus pushing the filter 24 between the plates 36 and 37 of the housing 21. During this movement the cylinder 58 is held against movement to the left as viewed in Figs. 3 and 7 because of engagement of the pawls 67 with the notches 66 in the strips 65 connected through the channel 64 with the cylinder 58. At the end of the stroke of the piston to the right the pressure fluid in the cylinder 58 is reversed against the piston so that the cylinder is moved to the right as viewed in Figs. 3 and 7 until the next set of notches 66 on the strips 65 are brought into engagement with the pawls 67. During this movement of the cylinder 58, the piston is held against movement to the left, because the new filter 24, now partially inserted between the plates 36 and 37, is held thereby and so holds the piston by virtue of its connection therewith through the piston rod 59 and the piece 60. This connection also enables the new filter 24 to be backed up in the housing 21.

As shown in Figs. 4 and 13, a flange 68a, which is secured to and extends around the open end of the container 25, is secured by screws 68b to the ends of racks 69 which extend along the exterior of the sides of the container 25 and mesh with gears 70 which are positioned within the pot 28 and fixed to shafts 71 projecting through the sides of the pot 28. Outside the pot 28 the shafts 71 are engaged by two ratchet wrenches 72 interconnected by a rod 73 which is engageable with a hook 74 at one end of a turnbuckle 75, the other end of which is connected to the pot 28. As shown in Fig. 14, each rack 69 is slidably supported from below by a channel 75a fixed to the interior of the pot 28. Each rack 69 is guided from above by the associated gear 70 and a restraining member 75b which is secured to the interior of the pot 28, as shown in Figs. 4 and 13. In Figs. 4, 13, and 14 only one rack 69, gear 70, shaft 71, and ratchet wrench 72 are shown.

At the outside of the sides of the pot 28 rods 76 are pivotally connected and are adapted to have their free ends hooked over straps 77 secured to the shielding structure 27, as indicated in Fig. 1, which actually shows only one rod 76 and strap 77. Engagement of the rods 76 with the straps 77 makes it possible for the pot 28 to be held in position with respect to the shielding structure 27 for enabling the racks 69, gears 70, wrenches 72, and turnbuckle 75 to hold container 25 in abutment with the housing 21, as shown in Figs. 4 and 10. In this position the top and bottom of the container 25 are aligned with the upper and lower plates 36 and 37 of the housing 21, and the flange 68a on the container 25 abuts the rectangular frame 48 of the housing 21. A seal 78a, set in recesses formed in the flange 68a and the open end of the container 25, acts between the container 25 and the housing 21.

When the new filter 24 is to replace the old filter 20 in the housing 21, the door 52 of the shielding structure 27 is removed, the tray 51 is connected to the housing 21, the new filter 24 is placed in the tray 51 adjacent the housing 21, the strips 65 are placed on the tracks 68, and the piston rod 59 is connected to the filter 24 by insertion of the piece 60 through the plate 62 and turning of the piece 60. Next a door 79 of the shielding structure 27 is removed, the pot 28 is shifted toward the shielding structure 27 from the position of Fig. 1 to that of Fig. 4 and is locked in the latter position by engagement of the rods 76 with the straps 77, a door 80 of the pot 28 is raised from the position of Fig. 1 to that of Fig. 4, and the container 25 is moved into engagement with the housing 21 as shown in Fig. 4 through manipulation of the ratchet wrenches 72 and is locked in this position by application of the hook 74 to the rod 73 and tightening of the turnbuckle 75. In the position of Fig. 4 the door 80 uncovers the end of the pot 28 while nearly closing to radiation the space between the shielding structure 27 and the top of the open end of the pot 28. In the position of Fig. 4 the door 80 is supported on the pot 28 by a bracket 81 on the pot and screws 82 going through the bracket into the door 80.

The seals 30 of the new filter 24 and the inside of the top and bottom container 25 may be preliminarily wiped with a rag coated with silicone grease.

The new filter 24 is now pushed between the plates 36 and 37 of the housing 21 by repeated movements of the piston and the piston rod 59 with respect to the cylinder 58 so as to move the old filter 20 out of the housing 21 and into the container 25. The new filter 24 assumes the position formerly held by the old filter 20 in registry with openings 38 and 39 of the plates 36 and 37 providing communication with the conduits 22 and 23. By assuming this position, the new filter 24 has pushed the old filter 20 just completely into the container 25.

The container 25 with the old filter 20 therein is pulled back into the pot 28 by the ratchet wrenches 72 after release of the rod 73 from the turnbuckle 75, and the door 80 is reapplied to the pot 28. As shown in Figs. 11 and 12, a cover 83, which is releasably held in a recess in the door 80 by friction and by an undercut 84, is secured to the open end of the container 25 by screws 85 extending through the cover 83 and the flange 68a into threaded engagement with nuts 86 secured to the flange 68a. The screws 85 are inserted through openings 87 (Fig. 12) in the door 80, which openings are closed by plugs 88 (Fig. 11). The pot 28 and filter 20 are now ready for shipment to a burial ground.

The door 79 is replaced on the shielding structure 27, the rod 59 is detached from the new filter 24, the strips 65 are removed from the tracks 68 taking along the cylinder 58 and the piston therein, the tray 51 is removed from the housing 21, and the door 52 is replaced on the shielding structure 27.

At the burial ground the container 25 is disconnected from the racks 69 by removal of the screws 68b, and then the door 80 is removed. Access to the screws 68b is had through plugged holes, not shown, in the door 80 similar to the holes 87 and through edge notches, not shown, in the cover 83. The used filter 20, the container 25, and the cover 83 attached thereto are now ready to be buried.

It will be understood that the arrangement of the present invention may also be applied to the handling of receptacles for large pieces of radioactive or noxious materials, rather than to the handling of filters. In other words, such a receptacle equipped with seals 30 at top and bottom will be inserted in the housing 21, filled as desired with pieces, and then shoved out of the housing into the container 25 by a new receptacle.

The intention is to limit the invention only within the scope of the appended claims.

What is claimed is:

1. An assembly comprising a housing including spaced opposed parallel plates having registering openings near one end and being imperforate throughout substantial regions extending from said openings toward the other end, a container having one end open and the opposite end closed and having a pair of opposed sides spaced from one another the same distance as the said plates of the housing, means for positioning the container to produce abutment of said open end thereof with said one end of the housing and alignment of said opposed sides of the container with said parallel plates of the housing, and a first filter having closed sides and opposed open ends located at said openings in the plates of the housing and seals running around the open ends and extending beyond the sides and ends in contact with said plates radially outwardly of said openings therein, whereby inlet and outlet conduits for a fluid to be filtered may be attached to said plates of the housing to communicate through said openings in said plates with the open ends of said first filter, the same may be replaced by a second filter similar thereto inserted between said plates of the housing at said other end and moved against said first filter to push the same into the container, and the extension of the seals beyond the sides of the filters produces a sealing engagement of the seals with one another preventing unfiltered flow of fluid between the openings in the plates of the housing even while both filters register with said openings.

2. The assembly specified in claim 1 and further comprising parallel tracks extending on the inner faces of the plates of the housing between the ends thereof and on opposite sides of the openings in the plates, the tracks serving to guide the second filter into registry with the openings in the plates.

3. The assembly specified in claim 2, the filters being of square outline whereby they will always fit the parallel tracks on the plates of the housing.

4. An assembly comprising a housing including spaced opposed parallel plates having registering openings near one end and being imperforate throughout substantial regions extending from said openings toward the other end, a shielding structure surrounding the housing, a shielding pot positioned adjacent said one end of the housing, a container located in the pot and having one end open and the opposite end closed and having a pair of opposed sides spaced from one another the same distance as the said plates of the housing, gear racks fastened to the open end of the container and extending along the sides thereof connecting the said opposed sides, gears mounted inside the pot and meshing with gear racks, means slidably supporting the gear racks on the interior of the pot so as to maintain the racks in mesh with the gears, means extending through the walls of the pot for rotating the gears and causing the racks to propel the container to produce abutment of said open end thereof with said one end of the housing and alignment of said opposed sides of the container with said parallel plates of the housing, and a first filter having closed sides and opposed open ends located at said openings in the plates of the housing, a trough connected with the housing at its said opposite end and having tracks, a piston rod for propelling a second filter from the trough into the housing into the position therein occupied by the first filter and to cause the second filter to push the first filter into the container, an hydraulic cylinder receiving the piston rod, notched bars riding in the tracks on the trough, a cross piece connecting the bars with the cylinder, and pawls mounted on the housing and engageable with the bars to prevent movement of the cylinder only in the direction opposed to that in which the piston rod moves to propel the second filter from the trough into the position occupied by the first filter.

References Cited in the file of this patent

FOREIGN PATENTS

| 748,901 | Great Britain | May 16, 1956 |
| 163,477 | Switzerland | Oct. 16, 1933 |